(12) United States Patent
Guo et al.

(10) Patent No.: US 12,566,347 B2
(45) Date of Patent: Mar. 3, 2026

(54) LAMP PANEL ASSEMBLY AND DISPLAY DEVICE

(71) Applicant: SEOUL SEMICONDUCTOR (SHENZHEN) CO., LTD, Shenzhen (CN)

(72) Inventors: Mingtao Guo, Shenzhen (CN); Jun Yan, Shenzhen (CN)

(73) Assignee: SEOUL SEMICONDUCTOR (SHENZHEN) CO., LTD, Shenzhen (CN)

( * ) Notice: Subject to any disclaimer, the term of this patent is extended or adjusted under 35 U.S.C. 154(b) by 0 days.

(21) Appl. No.: 18/686,972

(22) PCT Filed: Sep. 1, 2022

(86) PCT No.: PCT/CN2022/116473
§ 371 (c)(1),
(2) Date: Nov. 25, 2024

(87) PCT Pub. No.: WO2023/030436
PCT Pub. Date: Mar. 9, 2023

(65) Prior Publication Data
US 2025/0189848 A1       Jun. 12, 2025

(30) Foreign Application Priority Data

Sep. 1, 2021    (CN) .......................... 202111018631.2

(51) Int. Cl.
*G02F 1/00*          (2006.01)
*G02F 1/13357*          (2006.01)

(52) U.S. Cl.
CPC .. *G02F 1/133611* (2013.01); *G02F 1/133603* (2013.01); *G02F 1/133606* (2013.01)

(58) Field of Classification Search
None
See application file for complete search history.

(56) References Cited

U.S. PATENT DOCUMENTS

2010/0201911 A1 * 8/2010 Iiyama .............. G02F 1/133603
                                                              362/296.01
2014/0376219 A1 * 12/2014 Ono ..................... H10H 20/853
                                                              362/235

(Continued)

FOREIGN PATENT DOCUMENTS

CN          102893081 A       1/2013
CN          103162192 A       6/2013

(Continued)

OTHER PUBLICATIONS

International Search Report mailed on Nov. 28, 2022 in PCT/CN2022/116473 filed on Sep. 1, 2022 (2 pages).

*Primary Examiner* — Gerald J Sufleta, II
(74) *Attorney, Agent, or Firm* — Oblon, McClelland, Maier & Neustadt, L.L.P.

(57) ABSTRACT

A lamp panel assembly (10) and a display device (20). The lamp panel assembly (10) comprises: a substrate (100); one or more light-emitting elements (200) used for emitting light, the light-emitting elements (200) being disposed on the substrate (100); one or more light-transmissive members (300), the light-transmissive member (300) covering the light-emitting element (200), and the light-transmissive member (300) comprising a partially light-transmissive surface (301) located in front of the light-emitting element (200) and a completely light-transmissive surface (302) located on the side of the light-emitting element (200), wherein the partially light-transmissive surface (301) comprises a first inclined surface (311) and a second inclined surface (312) inclined relative to the light-emitting element (200), the inclination directions of the first inclined surface (311) and the second inclined surface (312) are different, a part of light emitted to the partially light-transmissive surface (301) by the light-emitting elements (200) is reflected, the other part is transmitted, and the reflected light is emitted (Continued)

through the completely light-transmissive surface (302). The light emission of the lamp panel assembly (10) may be more uniform.

15 Claims, 6 Drawing Sheets

(56)                References Cited

U.S. PATENT DOCUMENTS

| | | | |
|---|---|---|---|
| 2015/0219966 A1* | 8/2015 | Song | F21V 5/046 |
| | | | 362/97.3 |
| 2015/0268513 A1* | 9/2015 | Chang | H01L 25/0753 |
| | | | 362/241 |
| 2015/0300594 A1* | 10/2015 | Lee | G02B 19/0061 |
| | | | 362/311.01 |
| 2017/0075169 A1* | 3/2017 | Hayama | G02F 1/1368 |

FOREIGN PATENT DOCUMENTS

| | | |
|---|---|---|
| CN | 103890647 A | 6/2014 |
| CN | 104061526 A | 9/2014 |
| CN | 104101920 A | 10/2014 |
| CN | 104102044 A | 10/2014 |

* cited by examiner 217
216
215
214
213
212
211
23

20

LAMP PANEL ASSEMBLY AND DISPLAY DEVICE

BACKGROUND

1. Field

The present disclosure relates to a display technical field, and more particularly to a lamp panel assembly and display device.

2. Description of Related Art

Mini LED (Mini Light Emitting Diode) is a type of LED (Light Emitting Diode) screen, with a chip size thereof ranging between 50-200 μm, and is a technical product of LED miniaturization and matrixing. Compared to an ordinary LED, a Mini LED unit is less than 50 μm, only 1% the size, yet the picture representation and property thereof are several times better than those of the ordinary LED.

With the enhancement of the Mini LED technology, the screen now has multiple backlight partitions which may control the brightness of a small area of the screen independently. This allows for brighter areas to be sufficiently bright while darker areas may be appropriately dimmed, reducing the limitations in display performance. When a ceratin part of the picture needs to display black, the small backlight partition of this part may be dimmed or even turned off, to obtain a more pure black color and significantly improve contrast, which cannot be achieved by an ordinary LCD screen. With the enhancement of the Mini LED technology, it is possible to have a contrast close to that of an OLED screen.

SUMMARY

To overcome the problems existing in the related art, the present disclosure provides a lamp panel assembly and display device.

In accordance with a first aspect of the embodiments of the present disclosure, a lamp panel assembly is provided, which includes: a substrate; one or more light-emitting elements used for emitting light, the light-emitting elements being disposed on the substrate; one or more light-transmissive member, the light-transmissive member covering the light-emitting element, and the light-transmissive member including a partially light-transmissive surface located in front of the light-emitting element and a completely light-transmissive surface located on the side of the light-emitting element, wherein the partially light-transmissive surface includes a first inclined surface and a second inclined surface inclined relative to the light-emitting element, the inclination directions of the first inclined surface and the second inclined surface are different, a part of light emitted to the partially light-transmissive surface by the light-emitting element is reflected, the other part is transmitted, and the reflected light is emitted through the completely light-transmissive surface.

In an embodiment, among the first inclined surface and the second inclined surface of the partially light-transmissive surface, the amount of reflected light that is reflected is greater than the amount of transmitted light that is transmitted.

In an embodiment, the amount of reflected light refelcted on the first inclined surface decreases progressively from the position where the first and the second inclined surfaces are adjacent, towards the position where the first inclined surface and the completely light-transmissive surface are adjacent; and the amount of reflected light reflected on the second inclined surface decreases progressively from the position where the first and second inclined surfaces are adjacent, towards the position where the second inclined surface and the completely light-transmissive surface are adjacent.

In an embodiment, on the longitudinal cross-section of the partially light-transmissive surface, the portion where the first and second inclined surfaces are adjacent is recessed in a direction towards the light-emitting element.

In an embodiment, the light-transmissive member is interspersed with scattering particles; and/or the light-transmissive member is interspersed with fluorescent particles.

In an embodiment, the lamp panel assembly further includes a fluorescent ink; the fluorescent ink is disposed on the substrate and disposed to surround the light-emitting element.

In an embodiment, the fluorescent ink extends from the light-emitting element to the exterior of the light-transmissive member.

In an embodiment, the lamp panel assembly further includes a reflector; and the reflector is disposed on the substrate and the reflector is disposed to avoid the light-transmissive member.

In accordance with a second aspect of the embodiments of the present disclosure, a display device is provided, which includes a display module, having a display surface for displaying an image; a lamp panel assembly, disposed on the back surface of the display module opposite to the display surface; and a circuit board, disposed on the lamp panel assembly, wherein the lamp panel assembly includes: a substrate; one or more light-emitting elements, the light-emitting elements being disposed on the substrate, and the light-emitting element being located between the display module and the substrate; one or more light-transmissive members, the light-transmissive member covering the light-emitting element, and the light-transmissive member including a partially light-transmissive surface located in front of the light-emitting element and a completely light-transmissive surface located on the side of the light-emitting element, wherein the partially light-transmissive surface includes a first inclined surface and a second inclined surface inclined relative to the light-emitting element, the inclination directions of the first inclined surface and the second inclined surface are different, a part of light emitted to the partially light-transmissive surface by the light-emitting element is reflected, the other part is transmitted, and the reflected light is emitted through the completely light-transmissive surface.

In an embodiment, the display device further includes a diffuser layer; and the diffuser layer is disposed between the display module and the lamp panel assembly.

In an embodiment, the display device further includes an optical film; and the optical film is disposed between the display module and the diffuser layer.

In an embodiment, among the first inclined surface and the second inclined surface of the partially light-transmissive surface, the amount of reflected light that is reflected is greater than the amount of transmitted light that is transmitted.

In an embodiment, on the longitudinal cross-section of the partially light-transmissive surface, the portion where the first inclined surface and the second inclined surface are adjacent is recessed in a direction of towards the light-emitting element.

In an embodiment, the light-transmissive member is interspersed with scattering particles; and/or the light-transmissive member is interspersed with fluorescent particles.

In an embodiment, the amount of reflected light reflected on the first inclined surface decreases progressively from the position where the first and the second inclined surfaces are adjacent, towards the position where the first inclined surface and the completely light-transmissive surface are adjacent; and the amount of reflected light reflected on the second inclined surface decreases progressively from the position where the first and second inclined surfaces are adjacent, towards the position where the second inclined surface and the completely light-transmissive surface are adjacent.

In an embodiment, the lamp panel assembly further includes a fluorescent ink; and the fluorescent ink is disposed on the substrate and disposed to surround the light-emitting element.

In accordance with a third aspect of the embodiments of the present disclosure, a method for manufacturing a lamp panel assembly is provided, for manufacturing the lamp panel assembly as described in the aforementioned embodiments, which includes: curing the light-transmissive member; attaching the light-emitting element to the substrate; and attaching the light-transmissive member to the light-emitting element.

In accordance with a fourth aspect of the embodiments of the present disclosure, a backlight module is provided, which includes the lamp panel assembly as described in any one the aforementioned embodiments.

In accordance with a fifth aspect of the embodiments of the present disclosure, a display panel is provided, which includes the lamp panel assembly as described in any one the aforementioned embodiments.

The technical solutions provided in the embodiments of the present disclosure may include the following beneficial effects: in the present disclosure, the light emitted by the light-emitting element may be emitted through the light-transmissive member. Typically, the light emitted by the light-emitting element that reaches the light-transmissive member located in front of it is greater than the light that reaches the light-transmissive member located on its side, that is, the brightness of the area on the light-transmissive member located in front of the light-emitting element is greater than the brightness of the light-transmissive member located on the side of the light-emitting element.

The lamp panel assembly provided by the present disclosure sets the light-emitting surface of the light-transmissive member located in front of the light-emitting element as a partially light-transmissive surface. This partially light-transmissive surface can reflect a part of the light emitted by the light-emitting element, and the reflected light is emitted through the completely light-transmissive surface located on the side of the light-emitting element.

Such a setting may reduce the brightness of the light-transmissive member located in front of the light-emitting element while simultaneously increasing the brightness of the light-transmissive member located on the side of the light-emitting element. Thus, it is possible to achieve uniform brightness of the light-emitting surface of the light-transmissive member.

The setting of the present disclosure may make the light emission of the entire lamp panel more uniform by making the brightness of the light-emitting surface of an indivisual light-transmissive member uniform. Using the lamp panel assembly of the present disclosure as a backlight module may enhance the uniformity of backlighting of the backlight module, provide better backlighting for the display device and improve the display effect of the display device.

It should be understood that both the foregoing general description and the following detailed description are exemplary and explanatory and are not meant to limit the present disclosure.

BRIEF DESCRIPTION OF THE DRAWINGS

The drawings herein are incorporated into the description and form part of the present description, showing embodiments consistent with the present disclosure, and together with the description, it is used to explain the principles of the present disclosure.

DETAILED DESCRIPTION

Figure 1:
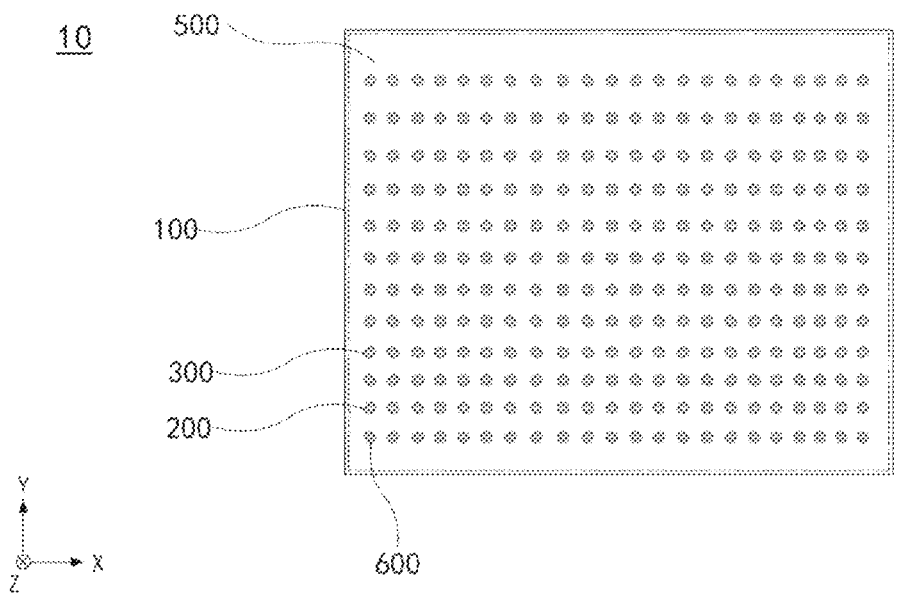
FIG. 1 is a schematic top view illustrating the structure of a lamp panel assembly according to an exemplary embodiment.

The exemplary embodiments will now be described in detail, examples of which are shown in the drawings. Where the description below relates to drawings, the same number in different drawings represents the same or similar element unless otherwise indicated. The embodiments described in the following exemplary embodiments do not represent all embodiments consistent with the present disclosure. Instead, they are only examples of apparatuses and methods consistent with some aspects of the present disclosure as detailed in the accompanying claims.

Mini LED (Mini Light Emitting Diode) is a type of LED (Light Emitting Diode) screen, with a chip size ranging between 50-200 μm, and is a technical product of LED miniaturization and matrixing. Compared to an ordinary LED, a Mini LED unit is less than 50 μm, only 1% the size, yet the picture representation and property thereof are several times better than those of the ordinary LED.

The lamp panel manufactured by the Mini LED technology has multiple LED emitting chips distributed on one substrate. With the enhancement of the Mini LED technology, the screen now has multiple backlight partitions which may control the brightness of a small area of the screen independently. This allows for brighter areas to be sufficiently bright while darker areas may be appropriately dimmed, reducing the limitations in display performance.

When a ceratin part of the picture needs to display black, the small backlight partition of this part may be dimmed or even turned off, to obtain a more pure black color and significantly improve contrast, which cannot be achieved by an ordinary LCD screen. With the enhancement of the Mini LED technology, it is possible to have a contrast close to that of an OLED screen.

However, the LED light-emitting chip emits light with higher brightness in the middle area and lower brightness on both sides, which easily results in nonuniform brightness across the lamp panel.

To overcome the problems existing in the related art, the present disclosure provides a lamp panel assembly and display device. In the present disclosure, the term "lamp panel assembly" is not limited to its literal content but may refer to a light module, light assembly, light component, etc., as long as it is a lamp panel aseembly that can be applied to the display device.

The lamp panel assembly provided by the present disclosure includes: a substrate; one or more light-emitting elements used for emitting light, and the light-emitting element being disposed on the substrate; one or more light-transmissive members, the light-transmissive member covering the light-emitting element, and the light-transmissive member including a partially light-transmissive surface located in front of the light-emitting element and a completely light-transmissive surface located on the side of the light-emitting element, wherein the partially light-transmissive surface includes a first inclined surface and a second inclined surface inclined relative to the light-emitting element, the inclination directions of the first inclined surface and the second inclined surface are different, part of light emitted by the light-emitting element to the partially light-transmissive surface is reflected, the other part is transmitted, and the reflected light is emitted through the completely light-transmissive surface.

In the present disclosure, the light emitted by the light-emitting element may be emitted through the light-transmissive member. Typically, the light emitted by the light-emitting element that reaches the light-transmissive member located in front of it is greater than the light that reaches the light-transmissive member located on its side, that is, the brightness of the area on the light-transmissive member located in front of the light-emitting element is greater than the brightness of the light-transmissive member located on the side of the light-emitting element.

The lamp panel assembly provided by the present disclosure sets a portion of the light-emitting surface of the light-transmissive member located in front of the light-emitting element as a partially light-transmissive surface. This partially light-transmissive surface can reflect part of the light emitted by the light-emitting element, and the reflected light is emitted through the completely light-transmissive surface located on the side of the light-emitting element.

Such a setting may reduce the brightness of the light-transmissive member located in front of the light-emitting element while simultaneously increasing the brightness of the light-transmissive member located on the side of the light-emitting element. Thus, it is possible to achieve uniform brightness of the light-emitting surface of the light-transmissive member.

The setting of the present disclosure may make the light emission of the entire lamp panel more uniform by making the brightness of the light-emitting surface of an individual light-transmissive member uniform. Using the lamp panel assembly of the present disclosure as a backlight module may enhance the uniformity of backlighting of the backlight module, provide better backlighting for the display device and improve the display effect of the display device.

Figure 2:
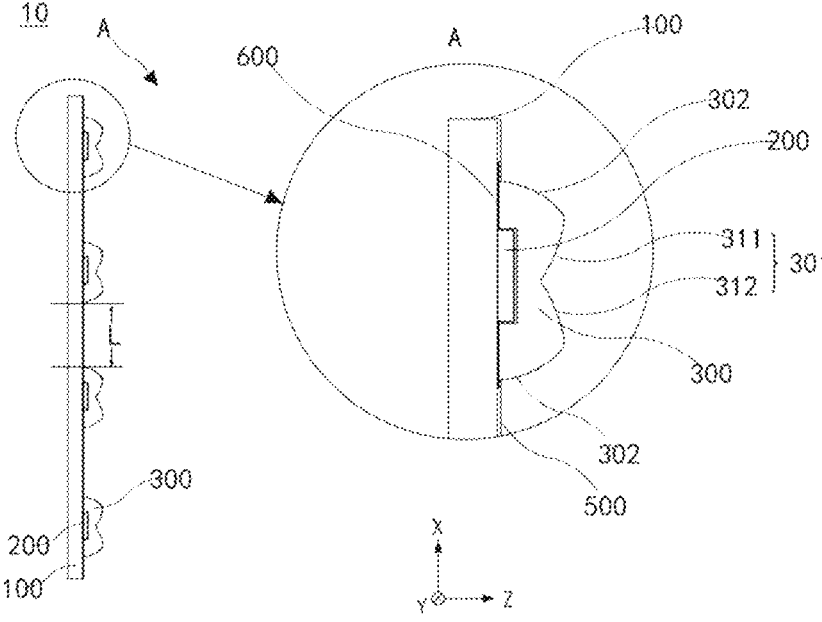
FIG. 2 is a schematic side view illustrating the structure of a lamp panel assembly according to an exemplary embodiment.

FIG. 1 is a schematic top view illustrating the structure of a lamp panel assembly according to an exemplary embodiment. FIG. 2 is a schematic side view illustrating the structure of a lamp panel assembly according to an exemplary embodiment.

As shown in FIGS. 1 and 2, the lamp panel assembly 10 of this disclosure includes a substrate 100, one or morelight-emitting elements 200, and one or more light-transmissive members 300. Along the Z-direction, the light-emitting element is disposed on the substrate 100, and if the surface where the lamp panel assembly emits light is defined as the light-emitting surface, the light-emitting element 200 is disposed on the light-emitting surface of the substrate 100.

As illustrated in FIGS. 1 and 2, the lamp panel assembly 10 may extend in the X-direction and Y-direction. It may be understood that the lamp panel assembly 10 extends on the plane formed by the X-direction and Y-direction where the X-direction and Y-direction are perpendicular to each other. In the present disclosure, the Z-direction may be perpendicular to the X-direction and perpendicular to the Y-direction. It may also be understood that the Z-direction may be perpendicular to the plane formed by the X-direction and Y-direction. It should be noted that in the present disclosure, the X-direction, Y-direction, and Z-direction are used to indicate relative positional directions, and are not limited to the specific directions shown in the drawings, depending on the different usage states of the lamp panel assembly.

In the present disclosure, the substrate 100 may be a Printed Circuit Board (PCB). The light-emitting element 200 may be a LED chip (Light Emitting Diode) used for emitting light. The light-emitting element 200 may be attached to the light-emitting surface of the substrate 100.

In the present disclosure, the light-emitting element 200 may be a chip that emits blue light, green light, or red light.

In the present disclosure, the light-transmissive member 300 covers the light-emitting element 200. As shown in FIG. 2, the light-transmissive member 300 further covers part of the substrate 100. This allows the light-transmissive member 300 to completely cover the light-emitting element 200, that is, the lights emitted by the light-emitting element 200 are all emitted through the light-transmissive member 300.

The surface of the light-transmissive member 300 opposite to the substrate 100 is opposite to the light-emitting element 200. The light emitted by the light-emitting element 200 enters the light-transmissive member 300 and is emitted through the light-emitting surface of the light-transmissive member 300. The light-emitting surface of the light-transmissive member 300 is the surface that is located on the side of the light-emitting surface of the the lamp panel assembly 10 and visible when viewing the lamp panel assembly 10 from above, that is, a light-emitting surface of the light-transmissive member 300.

The light-transmissive member 300 includes a partially light-transmissive surface 301 located in front of the light-emitting element 200, and a completely light-transmissive surface 302 located on the side of the light-emitting element 200. In the present disclosure, the aforementioned light-emitting surface of the light-transmissive member 300 may include the partially light-transmissive surface 301 and the completely light-transmissive surface 302.

In the present disclosure, the light-transmissive member 300 may be prisms made of silicone, and also known as lens.

In the present disclosure, as shown in FIG. 2, the light-emitting element 200 may be disposed in the middle of the light-transmissive member 300. The setting allows the light emitted by the light-emitting element 200 to be centro-symmetrically distributed on the light-transmissive member 300. Correspondingly, the partially light-transmissive surface 301 located in front of the light-emitting element 200 is located in the middle of the light-transmissive member 300, corresponding to the light-emitting element 200.

However, the present disclosure is not limited to this, and in other possible embodiments, the light-emitting element may also be disposed in non-central positions of the light-transmissive member, and correspondingly, the partially light-transmissive surface may also be in non-central positions of the light-transmissive member.

It should be noted that the partially light-transmissive surface 301 and the completely light-transmissive surface 302 are in a relative positional relationship in the present disclosure. The specific parameters such as the area, size, range, and position of the partially light-transmissive surface and the completely light-transmissive surface are not limited in the present disclosure, as long as the corresponding effect can be achieved.

Considering that light will experience different degrees of refraction, that is, a reflection phenomenon, in different media, the completely light-transmissive surface mentioned in the present disclosure refers to the inherent physical property of the medium. In actual situations, there may still be a part of light of the completely light-transmissive surface of the light-transmissive member that is reflected, but this belongs to the physical properties of the material of the light-transmissive member.

Similarly, the term "partially light-transmissive" in the partially light-transmissive surface mentioned in the present disclosure means that there are still other lights that are refelected excluding the light reflected due to the physical properties of the light-transmissive member.

As shown in FIG. 2, the partially light-transmissive surface 301 includes a first inclined surface 311 and a second inclined surface 312 that are inclined relative to the light-emitting element 200, and the inclination directions thereof are different.

In the present disclosure, the inclination angles of the first inclined surface 311 and the second inclined surface 312 are configured such that part of the light emitted by the light-emitting element 200 to the partially light-transmissive surface 301 is reflected, or undergoes total reflection. This reduces the amount of light emitted by the light-emitting element 200 which is transmitted from the middle position of the light-transmissive member 300, and thus reducing the brightness at the corresponding position on the light-transmissive member 300.

In the present disclosure, a part of the light emitted from the light-emitting element 200 to the partially light-transmissive surface 301 is reflected, the other part is transmitted, and the reflected light is emitted through the completely light-transmissive surface 302. Such a setting makes the light reflected by the partially light-transmissive surface 301 emitted through the completely light-transmissive surface 302, and increases the brightness of the completely light-transmissive surface 302 located on the side of the light-transmissive member 300.

The setting of the disclsoure allows the light emitted by the light-emitting element 200 to follow Lambertian emission, that is, the light intensity is highest in the middle position of the light-emitting element. The setting of the disclosure may reduce the light brightness in the middle position of the light-transmissive member, increases the light brightness in the side position of the light-transmissive member, and achieve uniform brightness.

Furthermore, the setting of the present disclosure makes the light brightness on the side surface of the individual light-transmissive member 300 increased. Multiple light-emitting elements 200 and light-transmissive members 300 are disposed on the lamp panel assembly 10, and the light brightness between two adjacent light-emitting elements 200 is also increased.

Based on this, while maintaining sufficient light brightness between two adjacent light-emitting elements 200, the distance between two adjacent light-emitting elements 200 may be reduced accordingly. Similarly, the distance between two adjacent light-transmissive members 300 may also be reduced.

As shown in FIG. 2, in the present disclosure, the distance L between two adjacent light-transmissive members 300 may be greater than or equal to 12 mm and less than or equal to 20 mm. The distance between two adjacent light-transmissive members 300 is often referred to as a pitch.

In the present disclosure, part of the light emitted by the light-emitting element 200 to the partially light-transmissive surface 301 is reflected, the other part is transmitted, and the transmitted light is emitted through the partially light-transmissive surface 301.

Figure 3:
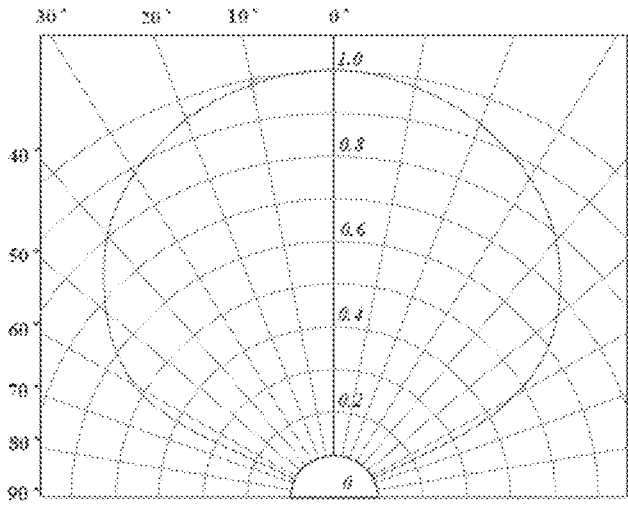
FIG. 3 is a schematic diagram of light distribution of a lamp panel assembly in the related art.
Figure 4:
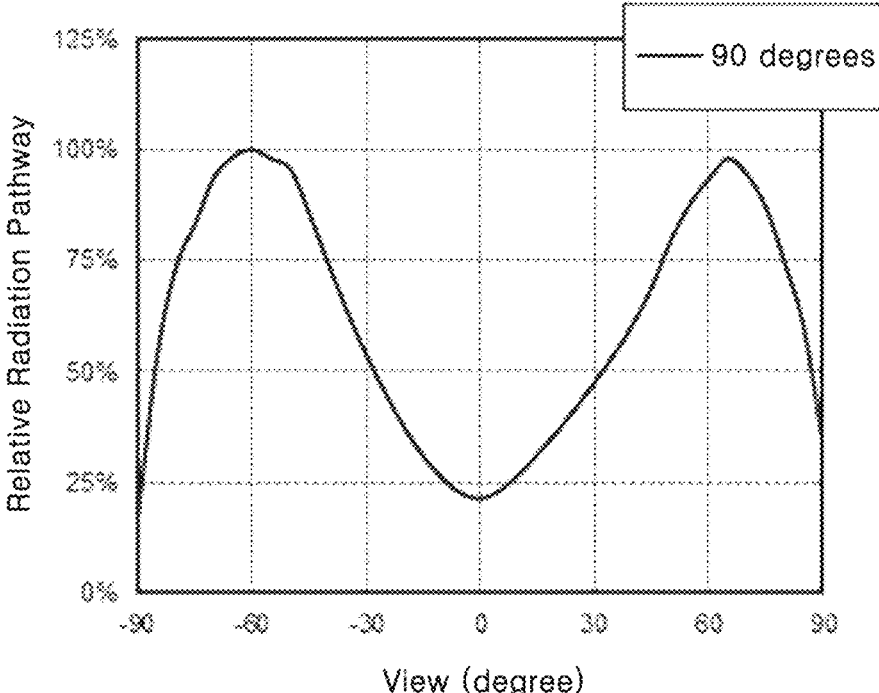
FIG. 4 is a schematic diagram of light distribution of a lamp panel assembly according to an exemplary embodiment.

FIG. 3 is a schematic diagram of light distribution of a lamp panel assembly in the related technology. FIG. 4 is a schematic diagram of light distribution of a lamp panel assembly according to an exemplary embodiment.

As shown in FIG. 4, after conducting tests on the lamp panel assembly provided according to the solution of the disclousre, it can be seen that the light emitted from the light-transmissive member 300 distributed on the partially light-transmissive surface in the middle position is less, while the light distributed on the completely light-transmissive surface in the side position is more.

In conclusion, according to the solution of the present disclosure, the brightness of the manufactured lamp panel assembly is more uniform.

As shown in FIG. 2, in the exemplary embodiment of the disclousre, on the longitudinal cross-section of the partially light-transmissive surface 301, the portion where the first inclined surface 311 and the second inclined surface 312 are adjacent is recessed in a direction towards the light-emitting element 200. Such a setting further reduces the amount of light emitted by the light-emitting element 200 from the middle position of the light-transmissive member 300, that is, the brightness in the middle position of the light-transmissive member 300 is further reduced.

Such a setting helps to further improve the uniformity of the light emitted by the light-transmissive member and further enhance the uniformity of brightness of the lamp panel assembly.

In the exemplary embodiment of the present disclosure, on the first inclined surface 311 and the second inclined surface 312 of the partially light-transmissive surface 301, the amount of reflected light that is reflected is greater than the amount of transmitted light that is transmitted.

Such a setting makes that the amount of light emitted from the partially light-transmissive surface 301 is less than the amount of light reflected by the partially light-transmissive surface 301. This further reduces the light brightness at the partially light-transmissive surface 301 and increases the light brightness at the completely light-transmissive surface 302. That is, it reduces the light brightness in the middle position of the light-transmissive member 300 and increases the light brightness in the side position of the light-transmissive member 300, thereby further enhancing the effect of uniform brightness.

In this exemplary embodiment of the present disclosure, the amount of light reflected by the first inclined surface 311 decreases progressively from the position where the first inclied surface 311 and the second inclined surface 312 are adjacent towards the position where the first inclined surface 311 and the completely light-transmissive surface 302 are adjacent.

Such a setting makes the light emitted from the first inclined surface 311 increase progressively from the middle position to the side position. That is, the light reflected at the middle position of the first inclined surface 311 is the most, while the transmitted light is the least.

In the exemplary embodiment of the present disclosure, the amount of light reflected by the second inclined surface 312 decreases progressively from the position where the first inclied surface 311 and the second inclined surface 312 are adjacent towards the position where the second inclined surface 312 and the completely light-transmissive surface 302 are adjacent.

Such a setting makes the light emitted from the second inclined surface 312 increase progressively from the middle position to the side position. That is, the light reflected at the middle position of the second inclined surface 312 is the most, while the transmitted light is the least.

In the related art, as shown in FIG. 3, the light distributed in the middle position of the light-transmissive member is the most and decreases progressively towards both sides. The setting of the present disclosure makes the light emitted through the light-transmissive member increase progressively from the middle to both sides. This allows for the light emitted from the middle of the light-transmissive member to be the least, and to increase towards both sides. Such a setting helps to further improve the uniformity of the light brightness on the partially light-transmissive surface.

Figure 5:
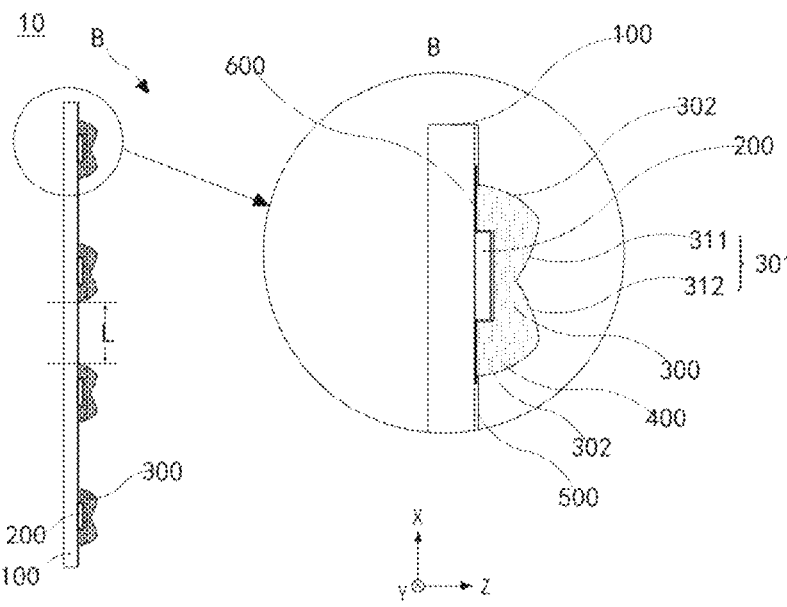
FIG. 5 is a schematic side view illustrating the structure of a lamp panel assembly according to another exemplary embodiment.

FIG. 5 is a schematic side view illustrating the structure of a lamp panel assembly according to another exemplary embodiment. As shown in FIG. 5, the present disclosure further provides a lamp panel assembly that includes a substrate 100, one or morelight-emitting elements 200, and one or more light-transmissive members 300. The light-emitting element 200 is disposed on the light-emitting surface of the substrate 100.

In the present disclosure, the light-transmissive member 300 covers the light-emitting element 200, and as shown in FIG. 5, the light-transmissive member 300 further covers a part of the substrate 100. This allows the light-transmissive member 300 to completely cover the light-emitting element 200, so that the light emitted by the light-emitting element 200 is emitted through the light-transmissive member 300.

The light-transmissive member 300 includes a partially light-transmissive surface 301 located in front of the light-emitting element 200 and a completely light-transmissive surface 302 located on the side of the light-emitting element 200. In the present disclosure, the aforementioned light-emitting surface of the light-transmissive member 300 may include the partially light-transmissive surface 301 and the completely light-transmissive surface 302.

As shown in FIG. 5, in this exemplary embodiment of the disclousre, the light-transmissive member 300 is interspersed with particles 400. These particles 400 may be scattering particles and/or fluorescent particles.

In the present disclosure, scattering particles can scatter the light emitted by the light-emitting element 200 which incident onto the light-transmissive member 300. After the light inside the light-transmissive member 300 is scattered by the scattering particles, it may be emitted more uniformly from the light-transmissive member 300.

Increasing the scattering particles helps to improve the light uniformity of the light-transmissive member 300 to the light emitted by the light-emitting element 200.

In the present disclosure, the scattering particles may also be referred to as diffusers. The diffusers in the present disclosure may be divided into organic diffusers and inorganic diffusers.

Among them, the inorganic light diffusers used in the present disclosure may include one or more of barium sulfate nanoparticles, calcium carbonate, silica, titanium dioxide, and aluminum hydroxide. However, the present disclosure is not limited to this, and other diffusers may also be used, as long as they can achieve the scattering effect.

The organic light diffusers used in the present disclosure mainly include acrylic, styrene, and acrylic resin. However, the present disclosure is not limited to this, and other diffusers may also be used, as long as they can achieve the scattering effect.

In the present disclosure, the particle size of the diffusers may be in the range of 1 μm to 10 μm. Diffusers within this particle size range may meet the scattering requirements of the lamp panel assembly of the present disclosure. However, the present disclosure is not limited to this, and diffusers of other particle sizes may also be used, as long as they can achieve the scattering effect.

In the present disclosure, fluorescent particles may also produce a light-scattering effect. Additionally, the fluorescent particles may emit fluorescence and may be matched with the light emitted by the light-emitting element 200 to form the light required by the product.

For example, in an embodiment, if the light-emitting element 200 emits blue light, yellow fluorescent particles may be used to emit white light from the light-transmissive member 300. However, the present disclosure is not limited to this, and in other possible embodiments, other colors of fluorescent particles may be used if the lamp panel assembly product needs to emit light of other colors or if the light-emitting element emits light other than blue light.

For example, in an embodiment, the light-emitting element 200 may emit green light and red light, and in this case, yellow fluorescent particles may also be used to emit white light.

In the present disclosure, fluorescent particles may also be referred to as phosphors and may include one or more of aluminate phosphor, silicate phosphor, nitride phosphor, and SF phosphor.

In the present disclosure, the optional D50 particle size of the aluminate phosphor may be in the range of 7 μm to 18 μm (±0.5 μm). The optional D50 particle size of the silicate phosphor may be in the range of 12 μm to 17 μm (±0.5 μm). The optional D50 particle size of the nitride phosphor may be in the range of 11 μm to 13 μm (±0.5 μm). The optional D50 particle size of the KSF phosphor may be in the range of 29 μm to 31 μm (±0.5 μm). However, the present disclosure is not limited to this, and in actual production and manufacturing, phosphors of corresponding colors with other particle sizes may also be used.

In some possible embodiments of the present disclosure, scattering particles and fluorescent particles may also be included simultaneously, so that the lamp panel assembly may emit lights with corresponding colors while achieving uniform brightness.

As shown in FIGS. 2 and 5, in the exemplary embodiments of the present disclosure, the lamp panel assembly 10 may further include a fluorescent ink 600. The fluorescent ink 600 is disposed on the substrate 100 and disposed to surround the light-emitting element 200.

In the present disclosure, the fluorescent ink 600 may be matched with the color of the light emitted by the light-emitting element 200, making the light color displayed by the lamp panel assembly 10 more uniform.

Specifically, if the light-emitting element 200 emits blue light and the lamp panel assembly 10 emits white light, yellow fluorescent particles may be used to form the fluorescent ink 600. The yellow fluorescent ink may be screen-printed at the corresponding position.

The setting of the fluorescent ink 600 makes that the light emitted by the light-emitting element 200, which incident onto the substrate 10 around the light-emitting element 200, is ultimately emitted as white light after the action of the fluorescent ink 600. That is, the setting of the fluorescent ink 600 may make the color of the white light emitted by the lamp panel assembly 10 more uniform, reducing the inherent color of the light-emitting element 200 itself.

Figure 6:
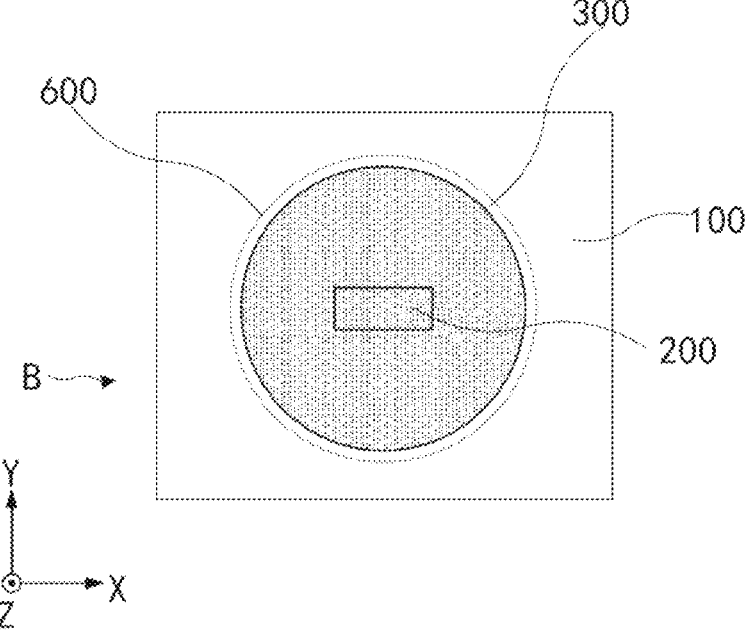
FIG. 6 is a schematic partial top view illustrating the structure of a lamp panel assembly according to an exemplary embodiment.

FIG. 6 is a schematic partial top view illustrating the structure of a lamp panel assembly according to an exemplary embodiment. As shown in FIG. 6, in the exemplary embodiment of the disclousre, the fluorescent ink 600 extends from the light-emitting element 200 to the exterior of the light-transmissive member 300.

As shown in FIG. 6, the setting range of the fluorescent ink 600 may go beyond the coverage range of the light-transmissive member 300. Such a setting may make the light emitted by the light-emitting element 200 match with the fluorescent ink 600 to the greatest extent to form the light with the required color, further ensuring the color uniformity of the light emitted by the lamp panel assembly 10.

In the present disclosure, the fluorescent ink is obtained by mixing fluorescent powder, polymer resin binder, solvents, and additives with a ratio, and then grinding, wherein the fluorescent powder may be one or more of aluminate phosphor, silicate phosphor, nitride phosphor, and sulfur fluoride phosphor.

In the present disclosure, the optional D50 particle size of the aluminate phosphor may be in the range of 7 μm to 18 μm (±0.5 μm). The optional D50 particle size of the silicate phosphor may be in the range of 12 μm to 17 μm (±0.5 μm). The optional D50 particle size of the nitride phosphor may be in the range of 11 μm to 13 μm (±0.5 μm). The optional D50 particle size of the KSF phosphor may be in the range of 29 μm to 31 μm (±0.5 μm). However, the present disclosure is not limited to this, and in actual production and manufacturing, fluorescent powders of corresponding colors with other particle sizes may also be used.

In the present disclosure, the fluorescent ink may be of the LPS-YOl model of "Chang Sheng" Company.

As shown in FIGS. 1, 2, and 5, in the exemplary embodiment of the present disclosure, the lamp panel assembly 10 may further include a reflector 500. The reflector 500 is disposed on the substrate 100 and the reflector 500 is disposed to avoid the light-transmissive member 300.

In the present disclosure, the reflector 500 may be a reflective film, a reflector plate, or a reflective paper that may be attached to the light-emitting surface of the substrate 100. The reflector 500 may reflect the light incident on the reflector 500, enhancing the brightness of the lamp panel assembly 10 and increasing the uniformity of the light emitted by the lamp panel assembly 10.

In the present disclosure, the material that may be used for the reflective paper may be one or more of PET (Polyethyleneterephthalate), PVC (Polyvinylchloride), or PP (Polypropylene).

Specifically, the lamp panel assembly 10 is usually used for backlighting in the display device, and multiple components may be disposed on the side of the light-emitting surface of the lamp panel assembly 10 to reflect the light emitted by the lamp panel assembly 10 to the light-emitting surface of the lamp panel assembly 10. The setting of the reflector 500 may again reflect the light emitted to the light-emitting surface of the lamp panel assembly 10, thereby enhancing the brightness of the lamp panel assembly 10 and improving the light efficiency of the lamp panel assembly 10.

In the present disclosure, a layer of white ink may also be disposed on the surface of the substrate, for example, by printing or coating. The white ink disposed on the surface of the substrate may be a low-reflectivity white ink, which may be used to protect the substrate and facilitate the subsequent setting of multiple elements or components on the substrate. The term "surface of the substrate" may refer to the surface or side of the substrate for disposing the light-emitting element.

Based on the same concept, the present disclosure further provides a method for manufacturing a lamp panel assembly for manufacturing the lamp panel assembly as described in the aforementioned embodiments, which includes:

S11: The step of curing the light-transmissive member.

In the present disclosure, a mold may be used to cure the light-transmissive member, that is, to first fix the shape of the light-transmissive member, which may prevent the shape of the light-transmissive member from changing due to movement of the lamp panel assembly during subsequent manufacturing steps.

Specifically, in the related art, it is common to use a dispensing method to adhere silicone to the light-emitting element, which often results in displacement of the silicone during subsequent manufacturing, increasing the rate of product defects. However, the setting of the present disclosure may reduce the reject rate of product and improve product quality.

Additionally, the setting of the present disclosure allows for the simultaneous curing of the light-transmissive member and other steps, thereby saving time waiting for the silicone to be cured and shortening the production cycle of the lamp panel assembly, which may improve the efficiency of manufacturing the lamp panel assembly.

S12: The step of attaching the light-emitting element to the substrate;

S13: The step of attaching the light-transmissive member to the light-emitting element.

In the present disclosure, following the attachment of the light-transmissive member to the light-emitting element, the following step may further be included:

S14: The step of attaching the reflector to the substrate.

Based on the same inventive concept, the present disclosure further provides a display device, including the lamp panel assembly as described in any one the aforementioned embodiments.

In the present disclosure, the term "display device" is not limited to the content defined by the word and may also be referred to as a "display panel," "display apparatus," or "display screen," and the like.

Figure 7:
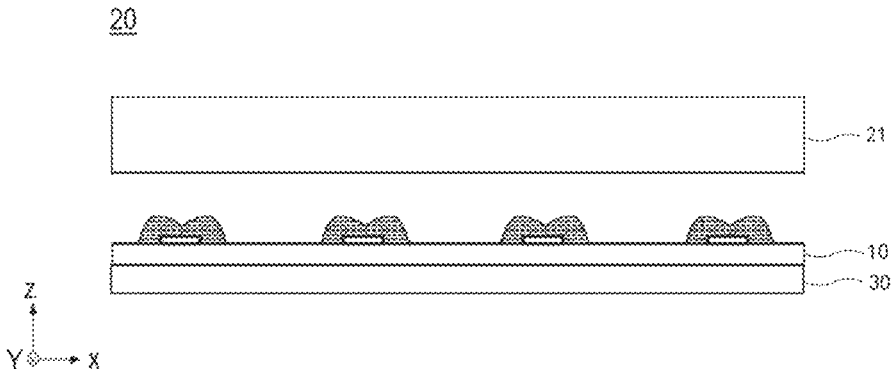
FIG. 7 is a schematic cross-sectional view illustrating the structure of a display device according to an exemplary embodiment.

FIG. 7 is a schematic cross-sectional view illustrating the structure of a display device according to an exemplary embodiment. As shown in FIG. 7, the display device provided in the present disclosure may include a display module 21, a lamp panel assembly 10, and a circuit board 30.

In the present disclosure, the display module 21 may have a display surface for displaying an image, for example, may include a display surface and a back surface disposed opposite to each other; the display surface of the display module 21 may be a surface that displays an images or a picture, and the back surface may be a surface opposite to the display surface. As shown in FIG. 7, in the Z direction, the display surface may be located above the back surface. The terms "above" and "below" are relative to the state and position of the display device as shown in the figure. Depending on the different usage states of the display device, the back surface may also be located above, and the display surface may be located above.

In the present disclosure, the lamp panel assembly 10 included in the display device 20 may be of any type described in the aforementioned embodiments, and as shown in FIG. 1, for example, the lamp panel assembly 10 may be disposed on the back surface of the display module 21 opposite to the display surface.

The lamp panel assembly 10 may include a substrate 100, one or more light-emitting elements 200, and one or more light-transmissive members 300. The light-emitting element 200 is disposed on the light-emitting surface of the substrate 100.

In the present disclosure, the substrate 100 may be disposed on the back surface of the display module 21 opposite to the display surface, and as shown in FIG. 7, the substrate 100 may be disposed below the display module 21.

The light-emitting element 200 is disposed on the substrate 100, and the light-emitting element 200 is disposed between the display module 21 and the substrate 100. As shown in FIGS. 2 and 7, the light-emitting element 200 may be disposed on the upper surface of the substrate 100. The light-emitting element 200 is used to emit light, and the emitted light is emitted towards the display module 21.

As shown in FIGS. 2 and 7, the light-transmissive member 300 covers the light-emitting element 200, and the light-transmissive member 300 includes a partially light-transmissive surface 301 in front of the light-emitting element 200 and a completely light-transmissive surface 302 on the side of the light-emitting element 200. That is, the light-transmissive member 300 is located between the display module 21 and the substrate 100.

As shown in FIG. 2, the partially light-transmissive surface 301 includes a first inclined surface 311 and a second inclined surface 312 inclined relative to the light-emitting element 200, and the inclination directions thereof are different.

Part of the light emitted by the light-emitting element 200 to the partially light-transmissive surface 301 is reflected, the other part is transmitted, and the reflected light is emitted through the completely light-transmissive surface 302.

As shown in FIG. 7, the display device 20 of the present disclosure may further include a circuit board 30, and the circuit board 30 is disposed opposite to the side of the substrate 100 away from the display module 21. As shown in FIG. 7, the circuit board 30 may be disposed below the lamp panel assembly 10.

In the present disclosure, the lamp panel assembly 10 may be electrically connected to the circuit board 30. The circuit board 30 may be disposed with a control unit, a receiving unit, an output unit, and other functional units that may control the startup and shutdown of the multiple light-emitting elements 200 on the lamp panel assembly 10, as well as the time of the startup and shutdown thereof.

In the present disclosure, the circuit board 30 may be the mainboard of the display device or a small board of the display device. The circuit board 30 may be used to control the lamp panel assembly 10. Alternatively, the circuit board 30 may also be electrically connected to the display module 21. The functional units on the circuit board 30 may also be used to control the display module 21, for example, to control the display module 21 to display a picture, and/or control the display module 21 to control a corresponding image.

It should be noted that in the present disclosure, the display device may include multiple different elements, and is not limited to the elements listed in the present disclosure. For example, in some embodiments, the display device may further include a shielding component, which is disposed on the side of the lamp panel assembly to prevent light emitted from the lamp panel assembly from leaking out and causeinginterference with the picture displayed by the display module due to the light leaking.

In the present disclosure, the shielding component may be a shielding plate, and may also be a function layer with a shielding effect coated on the side of the lamp panel assembly. The present disclosure does not specifically limit this, as long as it can achieve the corresponding purpose.

Figure 8:
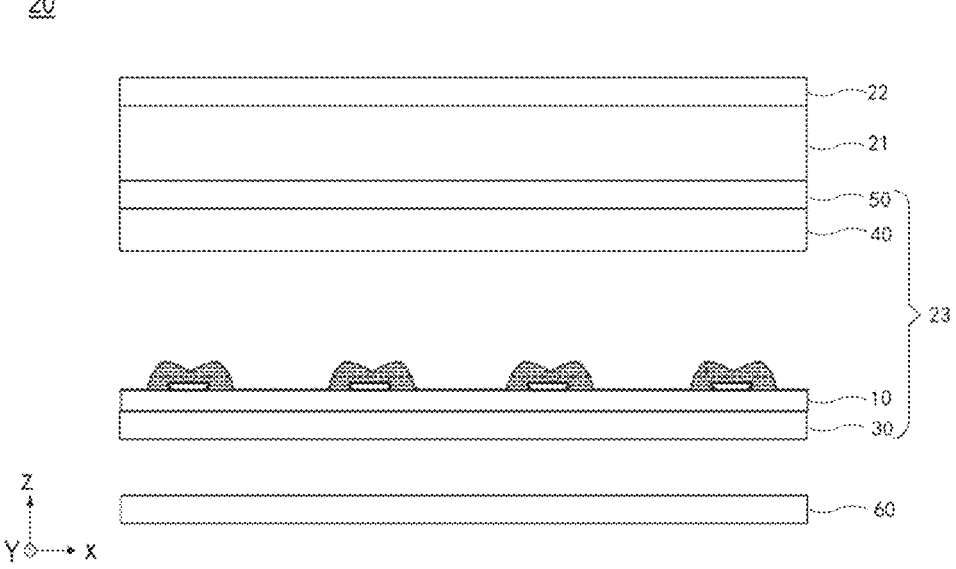
FIG. 8 is a schematic cross-sectional view illustrating the structure of a display device according to another exemplary embodiment.

In the present disclosure, the display device may further include other components. FIG. 8 is a schematic cross-sectional view illustrating a structure of a display device according to another exemplary embodiment. As shown in FIG. 8, the display device 20 may further include a diffuser layer 40, with the diffuser layer 40 disposed between the display module 21 and the lamp panel assembly 10. As illustrated in FIG. 8, the diffuser layer 40 may be disposed below the display module 21 and above the lamp panel assembly 10. The diffuser 40, also known as a diffuser plate, is used to provide the display device with a uniform surface light source. That is, the diffuser layer 40 may make the light emitted from the lamp panel assembly 10 more uniform, thereby providing the display device with a more uniform light source and improving the display quality of the display device.

Specifically, the diffuser layer 40 may also be components that have a light uniformity effect such as a light guide plate, light guide layer, or the like. The diffuser used in the present disclosure may be a polycarbonate diffuser plate, also known as a PC light-diffuser plate, PC uniform light plate, PC diffuse reflection plate, etc. In this case, the base material of the diffuser layer 40 is polycarbonate (PC).

As shown in FIG. 8, in the present disclosure, the display device 20 may further include an optical film 50, with the optical film 50 disposed between the display module 21 and the diffuser layer 40.

As shown in FIG. 8, the optical film 50 may be disposed above the diffuser layer 40, for example, attached to the upper surface of the diffuser layer 40. The optical film may include one or more of a diffuser plate, reflective plate, light guide plate, prism plate, etc. The specific setting may be determined based on the unique requirements of different display devices.

It should be noted that the display device illustrated in FIG. 8 simultaneously includes a diffuser layer and an optical film, with the diffuser layer disposed below the optical film, but the present disclosure is not limited to this. In some embodiments, the display device may further include only one of the diffuser layer and the optical film, or the display device may simultaneously include a diffuser layer and an optical film, but with the diffuser layer disposed above the optical film, as long as it can achieve the intended purpose.

In the present disclosure, the lamp panel assembly 10 of the display device 20 may be of any type described in the aforementioned embodiments, and will not be repeated here.

In the present disclosure, the display device may be a liquid crystal display (LCD), which uses a liquid crystal solution in two pieces of polarized materials. When an electric current passes through the liquid, the crystals will be rearranged to produce an image.

In the present disclosure, the LCD may be driven by any of the three driving methods: Static, Simple Matrix, or Active Matrix. Among them, the passive matrix type may be further divided into Twisted Nematic (TN), Super Twisted Nematic (STN), and other passive matrix-driven liquid crystal displays; while the active matrix type may be broadly distinguished to be two methods: Thin Film Transistor (TFT) and Metal/Insulator/Metal (MIM).

Figure 9:
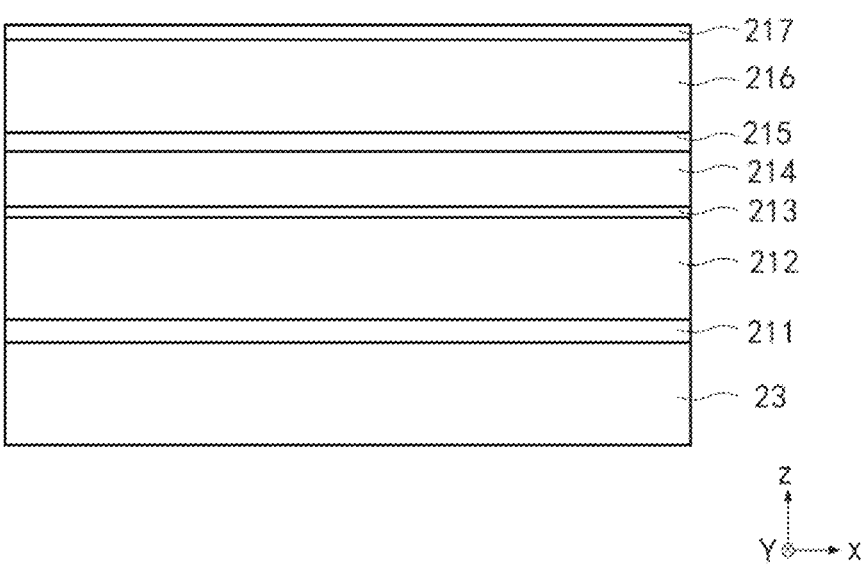
FIG. 9 is a schematic cross-sectional view illustrating the structure of a display device according to another exemplary embodiment.

FIG. 9 is a schematic cross-sectional view of a display device according to another exemplary embodiment. As shown in FIG. 9, the display device may include: a backlight module 23, a first polarizing plate 211 disposed on the backlight module 23, a first glass substrate 212 disposed on the first polarizing plate 211, a thin-film transistor layer (TFT) 213 disposed on the first glass substrate 212, a liquid crystal layer 214 disposed on the thin-film transistor layer 213, a color filter coating (CF) 215 disposed on the liquid crystal layer 214, a second glass substrate 216 disposed on the color filter coating 215, and a polarizing plate 217 disposed on the second glass substrate 216.

It should be noted that in the present disclosure, the backlight module 23 is used to provide a light source for the display device 20. In some embodiments, as illustrated in FIG. 8, the backlight module 23 may include the lamp panel assembly 10. However, the present disclosure is not limited to this, and in some embodiments, the lamp panel assembly may also be directly used as the backlight module, or in some cases, the lamp panel assembly may also be referred to as the backlight module.

Figure 10:
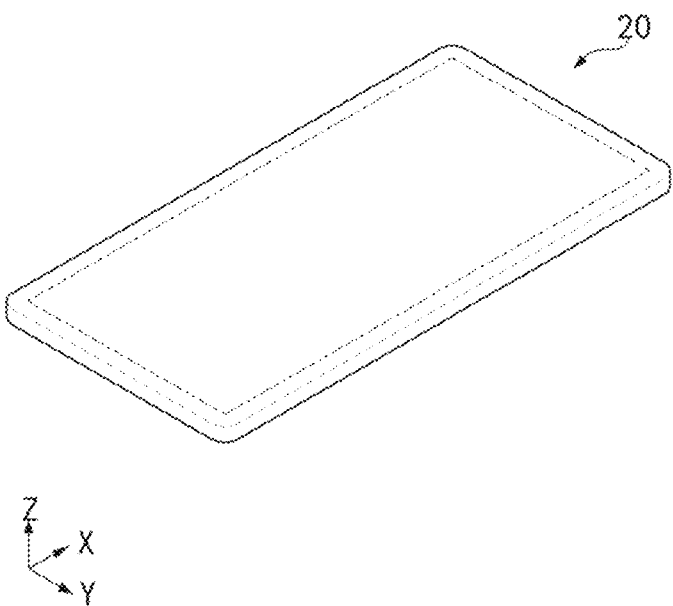
FIG. 10 is a schematic view illustrating the structure of a display device according to an exemplary embodiment.
Figure 11:
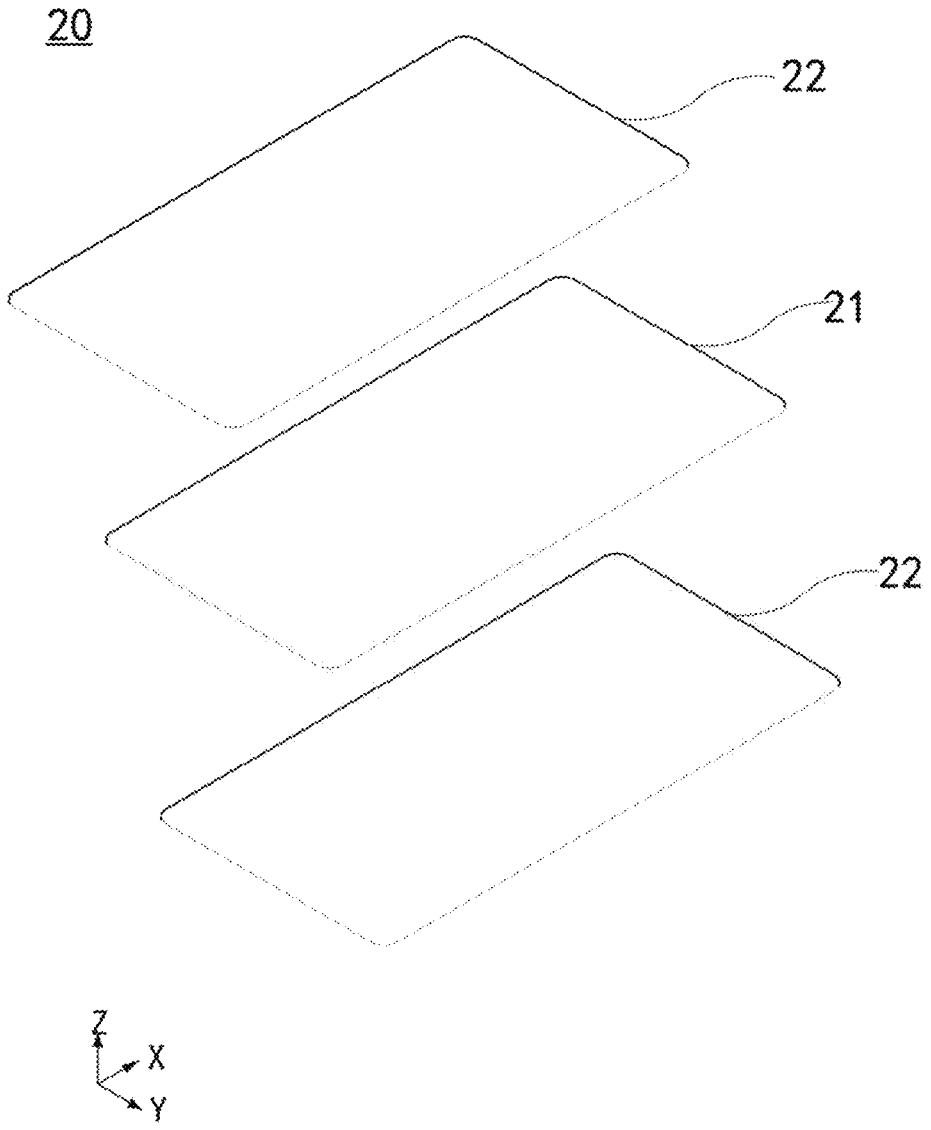
FIG. 11 is an exploded view of a display device according to an exemplary embodiment.

FIG. 10 is a schematic structural view of a display device according to an exemplary embodiment. FIG. 11 is an exploded view of a display device according to an exemplary embodiment.

As shown in FIGS. 10 and 11, the display device 20 may include a cover plate 22, a display module 21, and a backlight module 23. The backlight module 23 may include the lamp panel assembly as described in any one the aforementioned embodiments.

As shown in FIG. 8, the display device 20 of the present disclosure may further include a middle frame 60. The middle frame 60 may be a support inside the display device 20, for providing support for the circuit board 30 and other components. However, it should be noted that the present disclosure is not limited to this, in other embodiments, the middle frame 60 may also be located on the surface of the display device 20, that is, visible from the outside for the user. In such cases, the middle frame 60 may also be referred to as a back cover, battery cover, or casing.

The backlight module 23 of the display device 20 of the present disclosure provides a more uniform backlight, and the display device 20 has an improved display effect.

In the present disclosure, depending on the different types of display devices, multiple other components may be included, as long as they can acheive the purpose of displaying a picture, and the present disclosure does not specifically limit those components. Specifically, for example, if the display device is a mobile electronic device, it may also include a battery.

In the present disclosure, the light emitted by the light-emitting element may be emitted through the light-transmissive member. Typically, the light emitted by the light-emitting element that reaches the light-transmissive member located in front of it is greater than the light that reaches the light-transmissive member located on its side, that is, the brightness of the area on the light-transmissive member located in front of the light-emitting element is greater than the brightness of the light-transmissive member located on the side of the light-emitting element.

The lamp panel assembly provided by the present disclosure sets the light-emitting surface of the light-transmissive member located in front of the light-emitting element as a partially light-transmissive surface. This partially light-transmissive surface can reflect part of the light emitted by the light-emitting element, and the reflected light is emitted through the completely light-transmissive surface located on the side of the light-emitting element.

Such a setting may reduce the brightness of the light-transmissive member located in front of the light-emitting element while simultaneously increasing the brightness of the light-transmissive member located on the side of the light-emitting element. Thus, it is possible to achieve uniform brightness of the light-emitting surface of the light-transmissive member.

The setting of the present disclosure may make the light emission of the entire lamp panel more uniform by making the brightness of the light-emitting surface of an indivisual light-transmissive member uniform. Using the lamp panel assembly of the present disclosure as a backlight module may enhance the uniformity of backlighting of the backlight module, provide better backlighting for the display device and improve the display effect of the display device.

Based on the same concept, the present disclosure further provides a backlight module, including the lamp panel assembly described in any one of the aforementioned embodiments.

Based on the same concept, the present disclosure also provides a display panel, including the lamp panel assembly as described in any one the aforementioned embodiments.

It may be understood that the lamp panel assembly and display device provided in the embodiments of the present disclosure have corresponding hardware structures and/or software modules for executing the respective functions to achieve the above functions. Combining the units and algorithm steps in the respective examples disclosed in the embodiments of the present disclosure, the embodiments of the present disclosure can be implemented in the form of hardware or a combination of hardware and computer software. Whether a function is executed by hardware or by computer software driving hardware depends on the particular application and design constraints of the technical solution. Those skilled in the art may use different methods to implement the described functions for each particular application, but such implementations should not be considered as going beyond the scope of the technical solutions of the embodiments of the present disclosure.

It may be understood that in the present disclosure, "multiple" means two or more, and other quantifiers are similar. "And/or" describes the association between associated objects, indicating that there are three possible relationships. For example, A and/or B may represent: A exists alone, A and B exist together, or B exists alone. The character "/" generally represents an "or" relationship between the associated objects before and after. The singular forms "a," "the," and "said" are also intended to include plural forms, unless the context clearly dictates otherwise.

Furthermore, it may be understood that the terms "first," "second," and others are used to describe various informa- tion, but these information should not be limited to these terms. These terms are only used to distinguish information of the same type from each other and are not indicative of a specific order or importance. In fact, "first," "second," and other expressions may be used interchangeably. For example, without departing from the scope of the present disclosure, the first information may also be called second information, and similarly, second information may also be called first information.

Furthermore, it may be understood that the terms "center", "longitudinal", "lateral", "front", "back", "above", "below", "left", "right", "vertical", "horizontal", "top", "bottom", "inside", "outside", etc. indicating the direction or positional relationship are based on the direction or position relationship shown in the drawings and are only for the convenience of description of the embodiment and simplification of the description, but are not indicative or suggestive that the referred apparatus or component must have a specific orientation and be configured and operated in a specific orientation.

Furthermore, it may be understood that unless specifically stated, "connection" includes both direct connections where there are no other components between the two and indirect connections where there are other element between the two.

Furthermore, it may be understood that although the operations are described in a specific order in the drawings in the embodiments of the present disclosure, they should not be understood as requiring the operations to be executed in the shown specific order or in a sequential order, nor that all the shown operations must be performed to achieve the desired result. In a particular environment, multitasking and parallel processing may be advantageous.

Those skilled in the art will easily conceive of other embodiments of the present disclosure after considering the description and practicing the inventions disclosed here. The present application is intended to cover any variation, use, or adaptive change of the present disclosure that follow the general principles of the present disclosure and include the common knowledge or technical means commonly used in the art that are not disclosed in the present disclosure. The description and embodiments are to be considered exemplary only, with the true scope and spirit of the present disclosure being indicated by the following claims.

It should be understood that the present disclosure is not limited to the precise structures described above and shown in the drawings and that various amendments and changes may be made without departing from its scope. The scope of the present disclosure is only limited by the appended claims.

The invention claimed is:

1. A lamp panel assembly, comprising:
a substrate;
at least one light source, the at least one light source being disposed on the substrate; and
at least one light-transmissive material, the at least one light-transmissive material covering the at least one light source, and the at least one light-transmissive material including a first light-transmissive surface located in front of the at least one light source and a second light-transmissive surface located on a side of the at least one light source, wherein the first light-transmissive surface includes a first inclined surface inclined relative to an upper surface of the at least one light source and a second inclined surface inclined relative to the upper surface of the at least one light source, a direction of inclination of the first inclined surface being different from a direction of inclination of the second inclined surface,
wherein the second light-transmissive surface includes a rounded surface, and
wherein the at least one light source is disposed in a non-central position of the at least one light transmissive material.

2. The lamp panel assembly of claim 1, wherein a first portion of light that is reflected by the first light-transmissive surface is greater than a second portion of light that is transmitted by the first light-transmissive surface.

3. The lamp panel assembly of claim 2, wherein an amount of light reflected from the first inclined surface decreases progressively from a position where the first and the second inclined surfaces are adjacent, towards a position where the first inclined surface and the second light-transmissive surface are adjacent, and
an amount of light reflected from the second inclined surface decreases progressively from a position where the first and second inclined surfaces are adjacent, towards a position where the second inclined surface and the second light-transmissive surface are adjacent.

4. The lamp panel assembly of claim 2, wherein a portion of the first light-transmissive surface where the first and second inclined surfaces touch, is recessed in a direction towards the light source, relative to a remainder of the first light-transmissive surface.

5. The lamp panel assembly of claim 1, wherein
the at least one light-transmissive material includes scattering particles, or
the at least one light-transmissive material includes fluorescent particles.

6. The lamp panel assembly of claim 1, wherein
the lamp panel assembly further includes a reflector disposed on the substrate, the reflector being positioned such that it does not contact the at least one light-transmissive material.

7. A display device, comprising:
a display module including a display surface configured to display an image;
a lamp panel assembly disposed on a back surface of the display module opposite to the display surface; and
a circuit board disposed on the lamp panel assembly,
wherein the lamp panel assembly includes:
a substrate;
at least one light source, the at least one light source being disposed on the substrate; and
at least one light-transmissive material, the at least one light-transmissive material covering the at least one light source, and the at least one light-transmissive material including a first light-transmissive surface located in front of the at least one light source and a second light-transmissive surface located on a side of the at least one light source,
wherein the first light-transmissive surface includes a first inclined surface inclined relative to an upper surface of the at least one light source and a second inclined surface inclined relative to the upper surface of the at least one light source, a direction of inclination of the first inclined surface being different from a direction of inclination of the second inclined surface, wherein the second light-transmissive surface includes a rounded surface, and wherein the at least one light source is disposed in a non-central position of the at least one light transmissive material.

8. The display device of claim 7, wherein the display device further includes a diffuser layer, and the diffuser layer is disposed between the display module and the lamp panel assembly.

9. The display device of claim 8, wherein the display device further includes an optical film, and the optical film is disposed between the display module and the diffuser layer.

10. The display device of claim 7, wherein a first portion of light that is reflected by the first light-transmissive surface is greater than a second portion of light that is transmitted by the first light-transmissive surface.

11. The display device of claim 10, wherein a portion of the first light-transmissive surface where the first and second inclined surfaces touch, is recessed in a direction towards the light source, relative to a remainder of the first light-transmissive surface.

12. The display device of claim 11, wherein the at least one light-transmissive material includes scattering particles, or the at least one light-transmissive material includes fluorescent particles.

13. The display device of claim 12, wherein an amount of light reflected from the first inclined surface decreases progressively from a position where the first and the second inclined surfaces are adjacent, towards a position where the first inclined surface and the second light-transmissive surface are adjacent, and an amount of light reflected from the second inclined surface decreases progressively from a position where the first and second inclined surfaces are adjacent, towards a position where the second inclined surface and the second light-transmissive surface are adjacent.

14. The display device of claim 7, wherein the lamp panel assembly further includes a reflector disposed on the substrate, the reflector being positioned such that it does not contact the at least one light-transmissive material.

15. A lamp panel assembly, comprising:

a substrate;

at least one light source, the at least one light source being disposed on the substrate; and at least one light-transmissive material, the at least one light-transmissive material covering the at least one light source, and the at least one light-transmissive material including a first light-transmissive surface located in front of the at least one light source and a second light-transmissive surface located on a side of the at least one light source, wherein the first light-transmissive surface includes a first inclined surface inclined relative to an upper surface of the at least one light source and a second inclined surface inclined relative to the upper surface of the at least one light source, a direction of inclination of the first inclined surface being different from a direction of inclination of the second inclined surface, wherein the second light-transmissive surface includes a rounded surface, and wherein the at least one light source is disposed in a non-central position of the at least one light transmissive material.

* * * * *